M. TARRISSE.
FRICTIONAL GEARING.
APPLICATION FILED MAY 8, 1908.
982,104.
Patented Jan. 17, 1911.
2 SHEETS—SHEET 1.
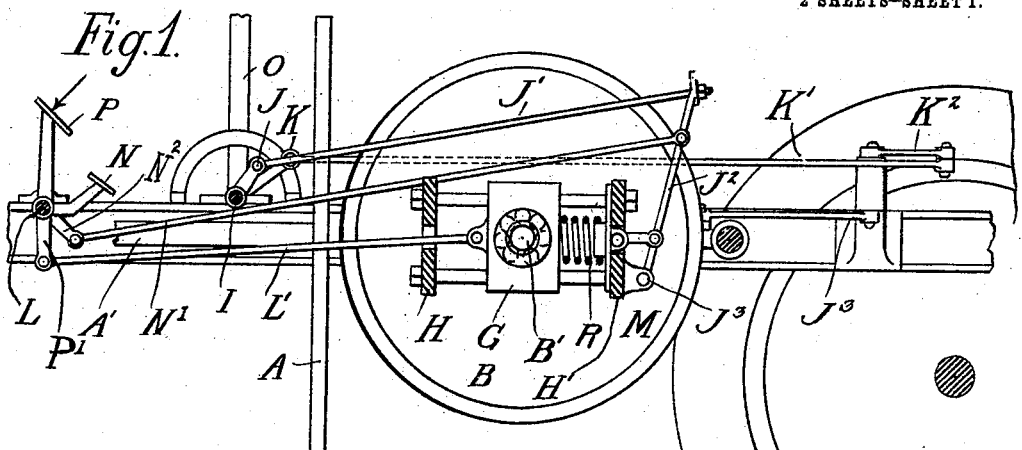
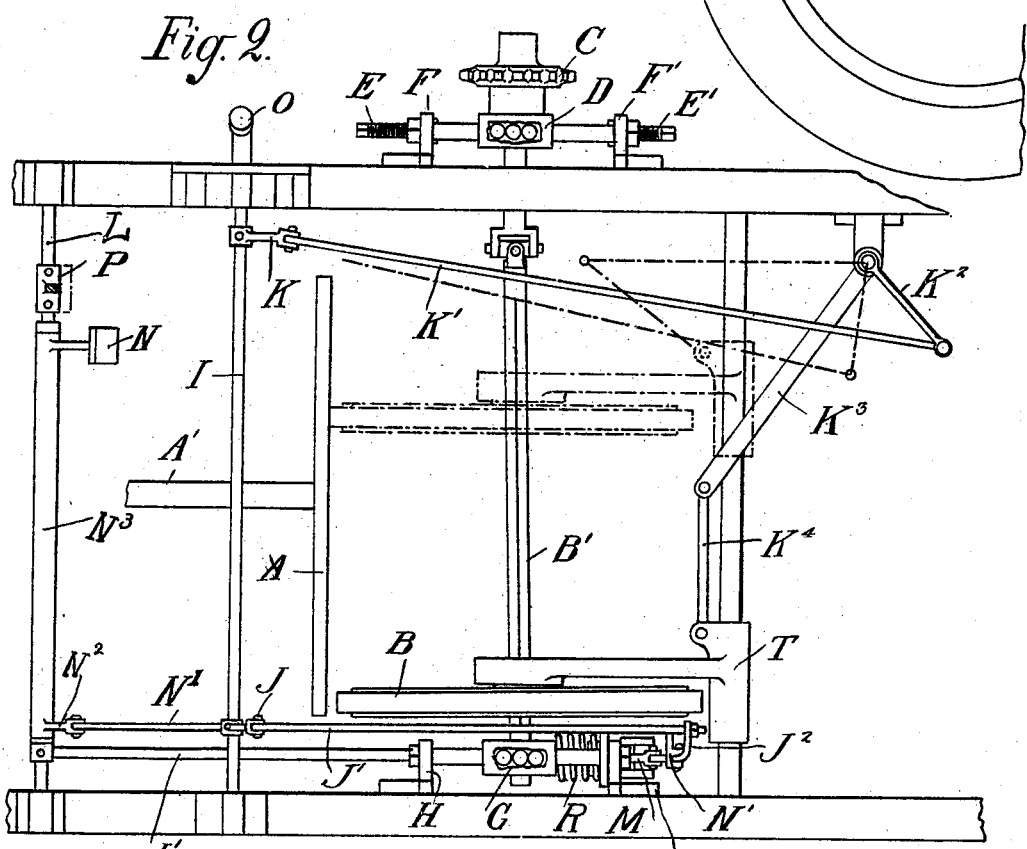
Witnesses:
Inventor:
Mathurin Tarrisse
By Knight Bros.
his Attorneys.

M. TARRISSE.
FRICTIONAL GEARING.
APPLICATION FILED MAY 8, 1908.

982,104.

Patented Jan. 17, 1911.
2 SHEETS—SHEET 2.

Witnesses:

Inventor:
Mathurin Tarrisse
By Knight Bros
his Attorneys.

UNITED STATES PATENT OFFICE.

MATHURIN TARRISSE, OF SURESNES, FRANCE.

FRICTIONAL GEARING.

982,104. Specification of Letters Patent. Patented Jan. 17, 1911.

Application filed May 8, 1908. Serial No. 431,695.

*To all whom it may concern:*

Be it known that I, MATHURIN TARRISSE, a citizen of the Republic of France, residing at 22 Boulevard de Versailles, Suresnes, Department of Seine and Oise, France, have invented certain new and useful Improvements in Frictional Gearing, of which the following is a specification.

This invention relates to a variable speed friction gearing for motor cars and other purposes of the type in which a plate is secured to the motor shaft and the power is conveyed from the motor to the driving wheels or other mechanism by means of a friction disk, at right angles to the plate on the motor shaft, the said friction disk having in addition to its motion of rotation, a motion to and from the plate and a motion of translation across the said disk so as to enable the driven mechanism to be stopped, started, driven at a variable speed and its direction of rotation to be reversed at will, and the object of the invention being particularly to automatically increase and decrease the pressure between the plate and friction disk as the said disk approaches and recedes from the center of the plate respectively, in relation to the speed, and to obtain a supplementary pressure between the plate and disk independently of the automatic pressure, the necessary movements to effect the said results being effected by suitable linkwork as hereinafter described.

Figure 3:
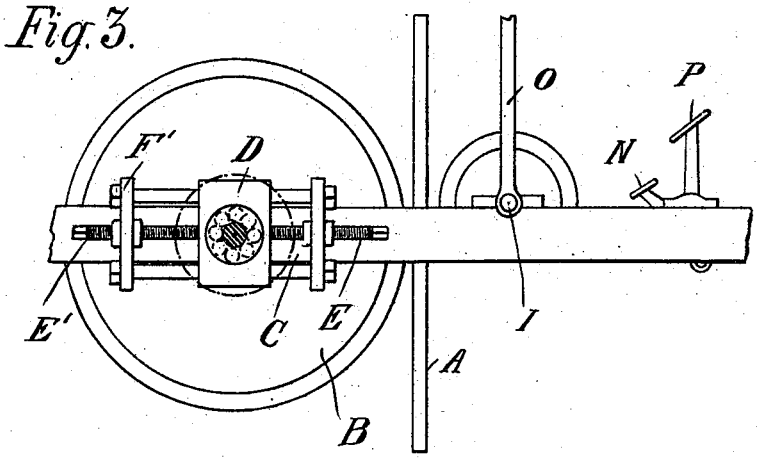
Figure 4:
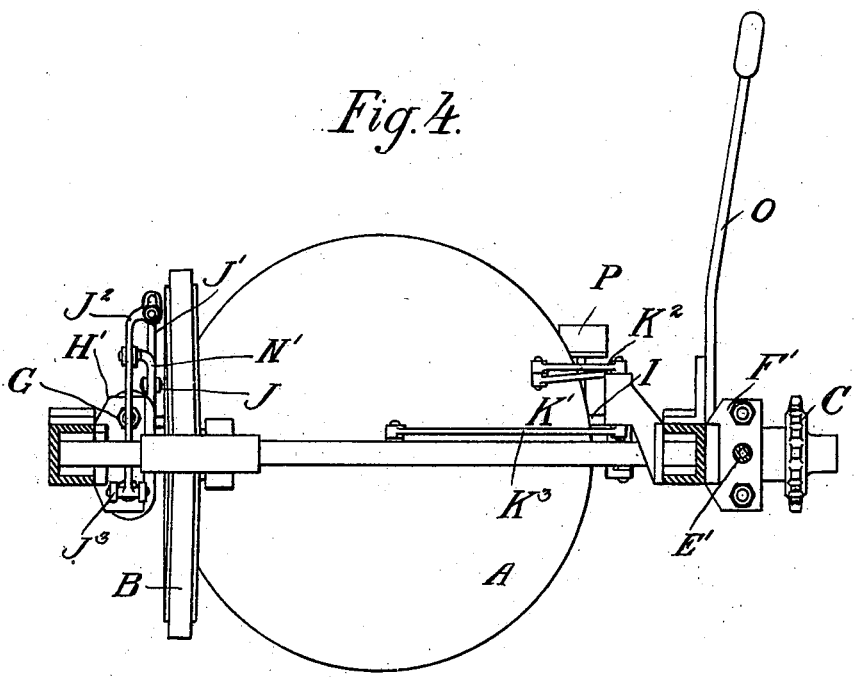

My invention is illustrated by the accompanying drawings in which:

Figure 1 is a diagrammatic side elevation of a variable speed friction gear constructed according to this invention and viewed from one side of the chassis. Fig. 2 is a diagrammatic plan of same. Fig. 3 is a diagrammatic elevation of the same gearing viewed from the opposite side of the chassis. Fig. 4 is a diagrammatic elevation viewed from the back of the chassis.

The same letters denote tne same parts throughout.

A is the plate which is secured to the motor shaft $A^1$ the plate A serving if desired as the fly wheel.

B is a friction disk which slides freely on the shaft $B^1$, the shaft $B^1$ being preferably square, so that when the disk B is in the position shown by Fig. 2 and is brought into contact with the plate A by means of the spring R the driven mechanism runs at its highest speed. As the disk B is moved nearer to the center of the plate A the speed of the driven mechanism decreases and when the disk B is in the position shown by the dotted lines (Fig. 2) the direction of rotation of the driven mechanism is reversed. The shaft $B^1$ rotates in ball bearings which are supported in slides G D to allow the chain to be adjusted to the proper tension, the said slides being supported by slide bars attached to the chassis by brackets H, $H^1$, F $F^1$, as shown.

The disk B is normally pressed against the disk A by the spring R and is removed out of contact therewith by depressing the pedal P which is carried by a rod L, which in turn is connected to a link $L^1$ by means of an arm $P^1$, the said link $L^1$ being connected to the slide G, as shown.

To change the rate of speed of the driven mechanism the following combinations of linkwork are employed. To the shaft I are attached two levers K and J, the lever K being connected by means of a link $K^1$ to a bell crank having a short arm $K^2$ and a long arm $K^3$; the long arm $K^3$ being connected by means of a link $K^4$ with the slider T which is provided with a strap which engages with two collars on the disk B in order to enable the latter to be moved across the face of the plate A. The lever J is connected by means of a link $J^1$ to a lever $J^2$ pivoted at $J^3$ to the bracket $H^1$, a link M connecting the lever $J^2$ to the spring R. The levers J and K are moved by means of the lever O which is secured to the shaft I in order to change the speed. When the lever O is moved to reduce the speed of the driven mechanism or to reverse the direction of rotation thereof the shaft I is rotated and by means of the lever K, link $K^1$ and bell crank $K^2$, $K^3$ the disk B is moved toward the center of the plate A or to a point on the opposite side of the center thereof. At the same time, the lever J, link $J^1$, lever $J^2$ and link M, compress the spring R so that as the disk B approaches the center of the plate A the pressure between the two disks is gradually increased.

In order to obtain a supplementary pressure between the plate A and disk B in any position of the disk, I provide a pedal N secured to the sleeve $N^3$, which oscillates on the rod L, an arm $N^2$ secured to the said sleeve being connected by means of the link $N^1$ to the lever $J^2$ which as aforesaid compresses the spring R. The lever $J^2$ passes through a hole provided at the end of link $J^1$ so as to enable the lever O' or pedal N to act on the spring independently.

Having thus described my invention, what I claim as new therein and desire to secure by Letters Patent, is:—

1. Friction gearing comprising driving and driven members, means for moving the driven member relatively to the driving member, resilient means for normally maintaining a frictional contact between said members and independent manually operated means coöperating with the last named means for increasing the frictional contact between said members.

2. Friction gearing comprising driving and driven members, means for moving the driven member relatively to the driving member, resilient means for normally maintaining a frictional contact between said members, independent manually operated means coöperating with the last named means for increasing the frictional contact between said members, and foot operated means independent of the manually operated means for coöperating with the resilient means for increasing or decreasing the frictional contact between the driven and driving members.

3. Friction gearing comprising driving and driven members, means for moving the driven member relatively to the driving member whereby the speed is reduced or increased, and resilient means for increasing the pressure between the driving and driven members as the driven member is moved toward the center of the driving member.

4. Friction gearing comprising driving and driven members, means for moving the driven member relatively to the driving member whereby the speed is reduced or increased, and resilient means for increasing the pressure between the driving and driven members as the driven member is moved toward the center of the driving member, and mechanical means for relieving the said members of the pressure created by said resilient means, whereby the driving and driven members may be separated.

5. In variable speed gearing, driving and driven friction members, means for moving the driven member relatively to the driving member, and resilient means connected to the last named means and constructed to operate simultaneously therewith, whereby pressure on the driven member will be increased as it is moved toward the center of the driving member, thus insuring the rotation of the driven member.

6. In friction gearing, the combination of driving and driven members, a shaft upon which the driven member is slidably mounted, said shaft being rotatably mounted and arranged to slide to and from the driving member, means connected to the driven member whereby the said member may be moved across the surface of the driving member and resilient means adapted to operate simultaneously with the last named means whereby pressure exerted against the driven member will be increased as the said member is moved toward the center of the driving member by the first named means.

7. Friction gearing comprising driving and driven members, means for moving the driven member relatively to the driving member, a spring arranged to exert pressure against said driven member whereby it will be held in contact with the driving member, mechanical means connected to the driven member whereby the pressure against said driven member may be diminished and independent foot operated means for increasing the pressure against said driven member.

The foregoing specification signed at Paris this twenty seventh day of April, 1908.

MATHURIN TARRISSE.

In presence of two witnesses:
F. O. NOEL,
DEAN B. MASON.